United States Patent
Nishida et al.

(10) Patent No.: US 7,245,434 B2
(45) Date of Patent: Jul. 17, 2007

(54) LIGHT-DIFFUSING SHEET, OPTICAL ELEMENT AND IMAGE DISPLAY

(75) Inventors: Akihiro Nishida, Ibaraki (JP); Shuuji Yano, Ibaraki (JP); Hiroe Maeda, Toyohashi (JP); Takashi Kondou, Ibaraki (JP); Takezou Hatanaka, Ibaraki (JP); Takuya Matsunaga, Kearny, NJ (US)

(73) Assignee: Nitto Denko Corporation, Osaka (JP)

( * ) Notice: Subject to any disclaimer, the term of this patent is extended or adjusted under 35 U.S.C. 154(b) by 198 days.

(21) Appl. No.: 10/511,397

(22) PCT Filed: Apr. 22, 2003

(86) PCT No.: PCT/JP03/05078

§ 371 (c)(1),
(2), (4) Date: Oct. 14, 2004

(87) PCT Pub. No.: WO03/091761

PCT Pub. Date: Nov. 6, 2003

(65) Prior Publication Data

US 2005/0152038 A1    Jul. 14, 2005

(30) Foreign Application Priority Data

Apr. 25, 2002    (JP)    .............................. 2002-123720

(51) Int. Cl.
*G02B 5/02*    (2006.01)
*G02B 13/20*    (2006.01)
(52) U.S. Cl. ...................... 359/599; 359/613
(58) Field of Classification Search ................ 359/599, 359/613; 428/141; 349/64, 112, 96
See application file for complete search history.

(56) References Cited

U.S. PATENT DOCUMENTS

| | | | |
|---|---|---|---|
| 5,387,463 A | 2/1995 | Nakamura et al. | |
| 5,770,306 A | 6/1998 | Suzuki et al. | |
| 6,064,524 A | 5/2000 | Oka et al. | |
| 6,528,142 B2 | 3/2003 | Ikegaya et al. | |
| 6,585,386 B1 | 7/2003 | Yano et al. | |

(Continued)

FOREIGN PATENT DOCUMENTS

EP    1 160 591 A1    12/2001

(Continued)

OTHER PUBLICATIONS

U.S. Appl. No. 10/983,520, filed Mar. 2005, Matsunaga et al.*

(Continued)

*Primary Examiner*—Stephone B. Allen
*Assistant Examiner*—Joshua L. Pritchett
(74) *Attorney, Agent, or Firm*—Knobbe Martens Olson & Bear LLP (57) ABSTRACT

A light-diffusing sheet includes a transparent film and a light-diffusing layer formed on at least one side of the transparent film. The transparent film contains a thermoplastic resin having a substituted and/or non-substituted imido group in a side chain, and a thermoplastic resin having a substituted and/or non-substituted phenyl group and nitrile group in a side chain, and the surface with the minute unevenness has an average height-depth spacing (Sm): $Sm \leq 80$ μm, a center-line average surface roughness (Ra): $Ra \leq 0.25$ μm and a ten-point average surface roughness (Rz): $Rz \leq 9Ra$.

11 Claims, 1 Drawing Sheet

U.S. PATENT DOCUMENTS

2002/0142133 A1  10/2002  Matsunaga et al.
2002/0150722 A1  10/2002  Suzuki

FOREIGN PATENT DOCUMENTS

| JP | 9-193332 | 7/1997 |
| JP | 9-193333 | 7/1997 |
| JP | 11-305010 | 11/1999 |
| JP | 11-326611 | 11/1999 |
| JP | 2000-35508 | 2/2000 |
| JP | 2000-80240 | 3/2000 |
| JP | 2000-227508 | 8/2000 |
| JP | 2000-338310 | 12/2000 |
| JP | 2001-91707 | 4/2001 |
| JP | 2001-154006 | 6/2001 |
| JP | 2001-290009 | 10/2001 |
| WO | WO 01/37007 A1 | 5/2001 |

OTHER PUBLICATIONS

U.S. Appl. No. 10/029,721, filed Oct. 2002, Matsunaga et al.*
U.S. Appl. No. 10/510,466, filed Oct. 7, 2004, Yano et al.

* cited by examiner

LIGHT-DIFFUSING SHEET, OPTICAL ELEMENT AND IMAGE DISPLAY This application is the U.S. National Phase under 35 U.S.C. §371 of International Application PCT/IJP03/05078, filed on Apr. 22, 2003, which claims priority of Japanese Patent Application No. 2002-123720, filed on Apr. 25, 2002. The International Application was published under PCT Article 21(2) in a language other than English.

FIELD OF THE INVENTION

The present invention relates to a light-diffusing sheet used in order to suppress decrease of the screen visibility of a visual display, such as in liquid crystal displays (LCD), organic EL displays and PDP, and to an optical element having the light-diffusing sheet concerned prepared thereto. Moreover, the present invention also relates to an image viewing display using the optical element.

BACKGROUND ART

Conventionally, in image viewing displays, such as LCD, an indoor lighting such as a fluorescent light, or incidence from sunlight from windows, or a reflection of operator's shadow etc. given to the viewing display surface sometimes aggravates visibility of pictures. Therefore, a light-diffusing layer is provided, on display surface, in which minute unevenness structure showing antiglare property, formed in order to diffuse a surface reflected light, to stop a regular reflection of outdoor daylight and to prevent a reflection of outside environment for the purpose of improvement in the visibility of images. As a formation method of light-diffusing layer, a method is mainly used in which a resin layer is formed from a coated layer having a resin containing fine-particles in dispersed state, because fine structure may be easily realized and at the same time excellent productivity may be realized by the method.

In the case where an LCD is required a high definition (for example, 120 ppi or more), however, when this LCD is equipped with the above-mentioned light diffusing layer, a portion appears on the LCD surface that has glittering and a different strength of brightness by an effect of convex lens effect demonstrated by a minute unevenness structure formed with particles projected on the surface of the light diffusing layer. Consequently, decrease in visibility may be caused.

A technical indication is disclosed, for example, in JP, 9-193332,A and JP, 9-193333,A that in order to solve such problems an average height-depth spacing (Sm) of a surface with minute unevenness structure, and an average of center-line surface roughness (Ra), etc. are to be adjusted in a specified range. However, in the technology, even if a surface with minute unevenness structure is controlled to have the above-mentioned property in the specific range, a defect of glittering cannot necessarily be efficiently inhibited.

As transparent films on each of which a light-diffusing layer is formed, there have generally been used films made of materials excellent in transparency such as triacetyl cellulose, polyethylene terephthalate and polycarbonate. A triacetyl cellulose film low in birefringence is main stream as a transparent film used on a polarizing plate indispensable in an LCD. A light-diffusing sheet having a triacetyl cellulose film on a surface of which a minute unevenness is formed, however, has had a problem that if the light-diffusing sheet is exposed to a humidified environment at a high temperature for a long time, the light-diffusing layer is peeled off or cracks because of hydrolysis of the triacetyl cellulose film.

There has been available a transparent film not subjected to hydrolysis in a humidified environment at a high temperature. Generally, used as such a transparent film is a stretched film with an improved mechanical strength. A stretched film generates retardation due to stretch. Hence, if a stretched film is used as a protective film for a polarizer, the film has an inconvenience to degrade a viewing angle characteristic. Recently, a norbornene-based resin film has been used as a transparent film hard in revelation of retardation even after stretch and excellent in optical properties, whereas such a film, in a case where a resin coating layer is provided thereon for light diffusion, is poor in adhesion to the resin coating layer, thereby causing formation of a light-diffusing layer thereon to be difficult.

It is an object of the present invention to, even in a case of application to a high definition LCD, provide a light-diffusing sheet, suppressing a screen glittering phenomenon while maintaining antiglareness, exhibiting almost no birefringence, and excellent in adhesion and durability.

Also it is an object of the present invention to provide an optical element having the light-diffusing sheet provided thereto, and further to provide an image viewing display using the optical element.

DISCLOSURE OF THE INVENTION

As a result of investigation by the present inventors wholeheartedly performed in order to solve the problems, it was found out that a light-diffusing sheet shown hereinafter might realize the object, resulting in completion of the present invention.

That is, the present invention relates to a light-diffusing sheet comprising a transparent film and a light-diffusing layer, which is made of a resin coating layer having a minute unevenness formed on a surface thereof, is formed on at least one side of the transparent film, wherein the transparent film includes a thermoplastic resin (A) having a substituted and/or non-substituted imido group in a side chain, and a thermoplastic resin (B) having a substituted and/or non-substituted phenyl group and nitrile group in a side chain, and an average height-depth spacing (Sm), a center-line average surface roughness (Ra) and a ten-point average surface roughness (Rz) on the surface with the minute unevenness satisfies the respective following relations:

$Sm \leq 80 \mu m$, $Ra \leq 0.25 \mu m$ and $Rz \leq 9Ra$.

Glittering on the surface of minute unevenness structure is considered to be caused by a lens effect mainly produced by a light with random strength induced by the surface concavo-convex structure. In the present invention, therefore, glittering is suppressed by methods in which the average height-depth spacing (Sm) is controlled to be 80 μm or less and the average of center-line surface roughness (Ra) is 0.25 μm or less, and glittering is decreased further by controlling the average of ten-point surface roughness (Rz) as small as possible so that Rz/Ra might become 9 or less. When the average of center-line surface roughness (Ra) becomes larger, the average of ten-point surface roughness (Rz) will also usually become larger, but in the present invention, screen glittering is suppressed, because the average of ten-point surface roughness (Rz) is controlled smaller as compared with the average of center-line surface roughness (Ra), and a convex structure is arranged to have the same form. When the above-mentioned values are out of the above-mentioned predetermined ranges, screen glittering is increased.

The average height-depth spacing (Sm) is preferably 70 µm or less and more preferably from 40 to 60 µm. Moreover, the average of center-line surface roughness (Ra) is preferably 0.2 µm or less, and more preferably from 0.1 to 0.17 µm. And the average of ten-point surface roughness (Rz) is preferably about from 1 to 1.5 µm. Furthermore, Rz/Ra, is preferably 7.5 or less.

The transparent film of the present invention includes a mixture of the thermoplastic resins (A) and (B) as main component. The transparent film exhibits almost no birefringence, has a low optical degradation even in an environment at a high temperature and a high humidity, and excellent in not only adhesion to the resin coating layer but also durability.

In the light-diffusing sheet, it is preferable that a 60° glossiness on the surface with the minute unevenness is 70% or less. The 60° glossiness that is 70% or less, effectively prevents reflection, and gives excellent antiglare property. The 60° glossiness is 60% or less, and preferably 40 to 50%.

If in the transparent film of the light-diffusing sheet, a direction along which an in-plane refractive index is maximized is X axis, a direction perpendicular to X axis is Y axis, the thickness direction of the film is Z axis; refractive indexes in the respective axis directions are nx, ny and nz; and a thickness of the transparent film is d (nm) by definition, it is preferable that the transparent film satisfies the following relations:

in-plane retardation $Re=(nx-ny) \times d \leq 20$ nm and thickness direction retardation $Rth=\{(nx+ny)/2-nz\} \times d \leq 30$ nm.

The in-plane retardation of a transparent film is preferably 20 nm or less and more preferably 10 nm or less, and a thickness direction retardation is 30 nm or less and more preferably 20 nm or less. A transparent film in which retardations are controlled in such a way, in a case where a light-diffusing sheet is applied to a polarizing plate, can decrease an influence on a polarization state of incident polarized light. A thickness d of the transparent film, which is not specifically limited, is generally in the range of from 10 to 500 µm and preferably in the range of from 20 to 300 µm. It is especially preferable that the thickness is in the range of from 30 to 200 µm.

The transparent film of the light-diffusing sheet is preferably a biaxially stretched film. Though no specific limitation is imposed on a stretch means and a stretch magnification, stretch magnifications are preferably equal in either of the MD direction and the TD direction. A stretch magnification is preferably in the range of from 0.5 to 3 times and more preferably in the range of from 1 to 2 times. Since general plastic materials generate birefringence by stretch, it is required to use a plastic material in an unstretched state if a polarization state is to be maintained. An unstretched film, however, is short of a strength and hence, hard in handling. A transparent film of the present invention including a mixture of the thermoplastic resins (A) and (B) as main component can provide a film excellent in strength since no birefringence is generated by stretch.

It is preferable that the resin coating layer in the light-diffusing sheet comprises fine particles and the surface unevenness shape of the resin coating layer is formed with the fine particles. A fine particle contained in the resin coating layer is preferably an organic fine particle. The resin coating layer is preferably formed with an ultraviolet curing resin.

By using fine particles, the resin coating layer with surface unevenness shape can be realized with ease and certainty and it is also easy to adjust the center-line average surface roughness (Ra), the average height-depth spacing (Sm), the ten-point average surface roughness (Rz). Especially, in a case where organic particles are used as fine particles, it is useful to suppress glittering. A resin coating layer (light-diffusing layer) can be efficiently formed in a simple processing operation by using an ultraviolet curing resin in a curing treatment with ultraviolet irradiation.

The present invention relates to a light-diffusing sheet that a low refractive index layer lower in refractive index than the resin coating layer is provided on the unevenness surface of the resin coating layer of the light-diffusing sheet. With the low refractive index layer provided, an antireflection function can be imparted to the light-diffusing sheet, thereby enabling screen whitening due to irregular reflection on screen image surface of a display or the like to be effectively suppressed.

The present invention further relates to an optical element comprising the light-diffusing sheet provided on one side or both sides of an optical element. The present invention still further relates to an image viewing display comprising the element. The light-diffusing sheet of the present invention can be used in various kinds of applications, for example in an optical element and in turn, applied in various kinds of image viewing displays.

BEST MODE FOR CARRYING OUT THE INVENTION

Figure 1:
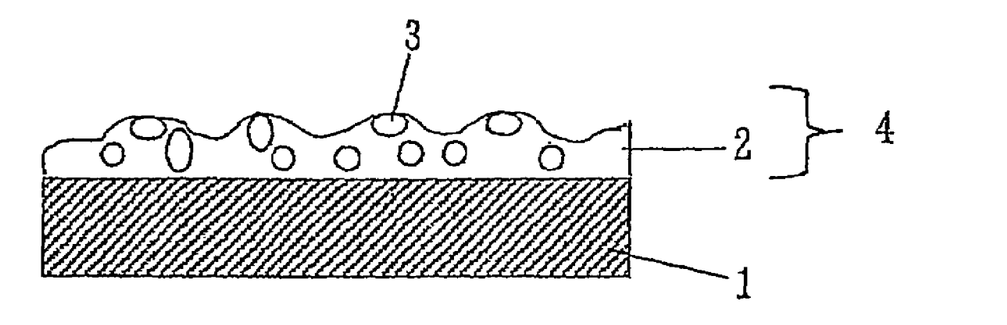
FIG. 1 is an example sectional view of a light-diffusing sheet of the present invention.

Description will be given of a preferred embodiment of the present invention below with reference to FIG. 1. FIG. 1 is a light-diffusing sheet in which a light-diffusing layer 4 is formed on a transparent film 1. The light-diffusing layer 4 is made of a resin coating layer 2 in which fine particles 3 are dispersed. The fine particles 3 dispersed in the resin coating layer 2 forms an unevenness shape at the surface of the light-diffusing layer 4. Note that while shown in FIG. 1 is a case of a single resin coating layer 2, a light-diffusing layer can also be formed with plural resin coating layers by separately forming the resin coating layers, which may contain fine particles, between the resin coating layer 2 and the transparent film 1.

A transparent film 1 is made of a mixture including a thermoplastic resin (A) having a substituted and/or non-substituted imido group in a side chain, and a thermoplastic resin (B) having a substituted and/or non-substituted phenyl group and nitrile group in a side chain on a side chain. A transparent protective film including such thermoplastic resins (A) and (B) are described, for example, in WO 01/37007. Note that a transparent protective film can also include other resins in a case where the film is made of the thermoplastic resins (A) and (B) as main component.

The thermoplastic resin (A) may have substituted and/or non-substituted imido group in a side chain, and a principal chain may be of arbitrary thermoplastic resins. The principal chain may be, for example, of a principal chain consisting only of carbon atoms, or otherwise atoms other than carbon atoms may also be inserted between carbon atoms. And it may also comprise atoms other than carbon atoms. The principal chain is preferably of hydrocarbons or of substitution products thereof. The principal chain may be, for example, obtained by an addition polymerization. Among concrete examples are polyolefins and polyvinyls. And the principal chain may also be obtained by a condensation polymerization. It may be obtained by, for example, ester bonds, amido bonds, etc. The principal chain is preferably of polyvinyl skeletons obtained by polymerization of substituted vinyl monomers.

As methods for introducing substituted and/or non-substituted imido group into the thermoplastic resin (A), well-known conventional and arbitrary methods may be employed. As examples for those methods, there may be mentioned a method in which monomers having the above-mentioned imido group are polymerized, a method in which the above-mentioned imido group is introduced after a principal chain is formed by polymerization of various monomers, and a method in which compounds having the above-mentioned imido group is grafted to a side chain. As substituents for imido group, well-known conventional substituents that can substitute a hydrogen atom of the imido group may be used. For example, alkyl groups, etc. may be mentioned as examples.

The thermoplastic resin (A) is preferably of two or more component copolymers including a repeating unit induced from at least one kind of olefin, and a repeating unit having at least one kind of substituted and/or non-substituted maleimido structure. The above-mentioned olefin-maleimido copolymers may be synthesized from olefins and maleimido compounds using well-known methods. The synthetic process is described in, for example, Japanese Patent Laid-Open Publication No. H5-59193, Japanese Patent Laid-Open Publication No. H5-195801, Japanese Patent Laid-Open Publication No. H6-136058, and Japanese Patent Laid-Open Publication No. H9-328523 official gazettes.

As olefins, for example, there may be mentioned, isobutene, 2-methyl-1-butene, 2-methyl-1-pentene, 2-methyl-1-hexene, 2-methyl-1-heptene, 1-iso octene, 2-methyl-1-octene, 2-ethyl-1-pentene, 2-ethyl-2-butene, 2-methyl-2-pentene, and 2-methyl-2-hexene etc. Among them, isobutene is preferable. These olefins may be used independently and two or more kinds may be used in combination.

As maleimido compounds, there may be mentioned, maleimide, N-methyl maleimide, N-ethylmaleimide, N-n-propyl maleimide, N-i-propyl maleimide, N-n-butyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclo propyl maleimide, N-cyclobutyl maleimide, N-cyclopentyl maleimide, N-cyclohexyl maleimide, N-cycloheptyl maleimide, and N-cyclooctyl maleimide, etc. Among them N-methyl maleimide is preferable. These maleimido compounds may be used independently and two or more kinds may be used in combination.

A content of repeating units of olefin in the olefin-maleimido copolymer is not especially limited, and it is approximately 20 through 70 mole % in all of repeating units in the thermoplastic resin (A), preferably 40 through 60 mole %, and more preferably 45 through 55 mole %. A content of repeating units of maleimido structure is approximately 30 through 80 mole %, preferably 40 through 60 mole %, and more preferably 45 through 55 mole %.

The thermoplastic resin (A) may comprise repeating units of the above-mentioned olefin, and repeating units of maleimido structure, and it may be formed only of these units.

And in addition to the above constitution, other vinyl based monomeric repeating units may be included at a percentage of 50 mole % or less. As other vinyl based monomers, there may be mentioned, acrylic acid based monomers, such as methyl acrylate and butyl acrylate; methacrylic acid based monomers, such as methyl methacrylate and cyclo hexyl methacrylate; vinyl ester monomers, such as vinyl acetate; vinyl ether monomers, such as methyl vinyl ether; acid anhydrides, such as maleic anhydride; styrene based monomers, such as styrene, α-methyl styrene, and p-methoxy styrene etc.

A weight average molecular weight of the thermoplastic resin $_3$(A) is not especially limited, and it is approximately $1\times10^3$ through $5\times10^6$. The above-mentioned weight average molecular weight is preferably $1\times10^4$ or more and $5\times10^5$ or more. A glass transition temperature of the thermoplastic resin (A) is 80° C. or more, preferably 100° C. or more, and more preferably 130° C. or more.

And glutar imido based thermoplastic resins may be used as the thermoplastic resin (A). Glutar imido based resins are described in Japanese Patent Laid-Open Publication No. H2-153904 etc. Glutar imido based resins have glutar imido structural units and methyl acrylate or methyl methacrylate structural units. The above-mentioned other vinyl based monomers may be introduced also into the glutar imido based resins.

The thermoplastic resin (B) is a thermoplastic resin having substituted and/or non-substituted phenyl group, and nitrile group in a side chain. As a principal chain of the thermoplastic resin (B), similar principal chains as of the thermoplastic resin (A) may be illustrated.

As a method of introducing the above-mentioned phenyl group into the thermoplastic resin (B), for example, there may be mentioned a method in which monomers having the above-mentioned phenyl group is polymerized, a method in which phenyl group is introduced after various monomers are polymerized to form a principal chain, and a method in which compounds having phenyl group are grafted into a side chain, etc. As substituents for phenyl group, well-known conventional substituents that can substitute a hydrogen atom of the phenyl group may be used. For example, alkyl groups, etc. may be mentioned as examples. As method for introducing nitrile groups into the thermoplastic resin (B), similar methods for introducing phenyl groups may be adopted.

The thermoplastic resin (B) is preferably of two or more components copolymers comprising repeating unit (nitrile unit) induced from unsaturated nitrile compounds, and repeating unit (styrene based unit) induced from styrene based compounds. For example, acrylonitrile styrene based copolymers may preferably be used.

As unsaturated nitrile compounds, arbitrary compounds having cyano groups and reactive double bonds may be mentioned. For example, acrylonitrile, α-substituted unsaturated nitrites, such as methacrylonitrile, nitrile compounds having has α- and β-disubstituted olefin based unsaturated bond, such as fumaronitrile may be mentioned.

As styrene based compound, arbitrary compounds having a phenyl group and a reactive double bond may be mentioned. For example, there may be mentioned, non-substituted or substituted styrene based compounds, such as styrene, vinyltoluene, methoxy styrene, and chloro styrene; α-substituted styrene based compounds, such as α-methyl styrene.

A content of a nitrile unit in the thermoplastic resin (B) is not especially limited, and it is approximately 10 through 70% by weight on the basis of all repeating units, preferably 20 through 60% by weight, and more preferably 20 through 50% by weight. It is further preferably 20 through 40% by weight, and still further preferably 20 through 30% by weight. A content of a styrene based unit is approximately 30 through 80% by weight, preferably 40 through 80% by weight, and more preferably 50 through 80% by weight. It is especially 60 through 80% by weight, and further preferably 70 through 80% by weight.

The thermoplastic resin (B) may comprise repeating units of the above-mentioned nitrites, and styrene based repeating units, and it may be formed only of these units. And in addition to the above constitution, other vinyl based monomeric repeating units may be included at a percentage of 50 mole % or less. As other vinyl based monomers, compounds, repeating units of olefins, repeating units of maleimide and substituted maleimides, etc. may be mentioned, which were illustrated in the case of thermoplastic resin (A). As the thermoplastic resins (B), AS resins, ABS resins, ASA resins, etc. may be mentioned.

A weight average molecular weight of the thermoplastic resin (B) is not especially limited, and it is approximately $1 \times 10^3$ through $5 \times 10^6$. It is preferably $1 \times 10^4$ or more, and $5 \times 10^5$ or less.

A compounding ratio of the thermoplastic resin (A) and the thermoplastic resin (B) is adjusted depending on a retardation required-for a transparent protective film. In the above-mentioned compounding ratio, in general, a content of the thermoplastic resin (A) is preferably 50 through 95% by weight in total amount of a resin in a film, more preferably 60 through 95% by weight, and still more preferably 65 through 90% by weight. A content of the thermoplastic resin (B) is preferably 5 through 50% by weight in total amount of the resin in the film, more preferably 5 through 40% by weight, and still more preferably 10 through 35% by weight. The thermoplastic resin (A) and the thermoplastic resin (B) are mixed using a method in which these are kneaded in thermally molten state.

A thickness of the transparent film 1 is determined appropriately, and in general, it is approximately 10 to 500 µm so that it may have suitable thinness, or in viewpoint of workability, such as strength and handling property. Especially it is preferably 20 to 300 µm, and more preferably 30 to 200 µm.

The light-diffusing layer 4 having the minute unevenness surface can be formed by adopting any of proper methods without imposing a limitation on a forming method as far as the layer is formed on the transparent film 1. For example, a surface itself of the transparent film 1 can be the light-diffusing layer 4 having the minute unevenness surface.

From the viewpoint of productivity, it is preferable to provide the resin coating layer 2 having the minute unevenness surface as the light-diffusing layer 4. For example, a method of forming minute-unevenness structure on a surface of a material itself that forms the resin coating layer 2 may be mentioned. As illustrative examples, a method may be mentioned in which rough surfacing processing is beforehand given to the surface of the film used for formation of the above described resin coating layer 2 by proper manners, such as sandblasting, roll embossing, and chemical etching to give minute unevenness structure to the film surface. And, a method may also be mentioned in which additional coating of another resin coating layer is separately given on the resin coating layer 2, and minute unevenness structure is given by a transfer method with metal mold etc. onto the resin coating layer surface concerned. Furthermore, as shown in FIG. 1, minute unevenness structure is given by dispersing fine particles 3 in the resin coating layer 2 may be mentioned. In the formation method of these minute unevenness structures, two or more kinds of methods may be used in combination, and a layer may be formed in which different type of minute unevenness structures are compounded on the surface. In the formation method of the above described resin coating layer 2, a method of forming a resin coating layer 2 that contains the fine particles 3 dispersed therein is preferable in view of easiness and reliability of formation of minute unevenness structure.

Hereinafter, a method will be described in which fine particles 3 are included in a dispersed state to prepare a resin coating layer 2. As resins that form the resin coating layer 2 concerned, resins in which the fine particles 3 may be dispersed, strength sufficient as a coated layer after the resin coating layer is formed and transparency are demonstrated may be used without any limitation. Resins of thermosetting type, resins of thermoplastic type, resins of ultraviolet curable type, resins of electron beam curable type, resins of two components mixing type, etc. may be mentioned. And among them, a resin of ultraviolet curable type that may form a light-diffusing layer efficiently through easy processing operation by curing processing with UV irradiation is suitable.

Among examples of resins of ultraviolet curable type are various kinds of resin, such as polyester based, acrylic based, urethane based, amide based, silicone based, and epoxy based resins, and ultraviolet curing type monomers, oligomers, and polymers etc. are also included. As a resin of ultraviolet curable type used preferably, for example, a resin that has functional groups with ultraviolet rays polymerizable property and a resin that includes, as a component, acrylic based monomers and oligomers having two or more, especially 3 to 6 of functional groups concerned may be mentioned. And, ultraviolet polymerization initiator is blended in resins of ultraviolet curable type.

In the ultraviolet curing resin (formation of the resin coating layer 2), there can be used additives such as a leveling agent, a thixotropic agent and an antistatic agent. The use of a thixotropic agent is useful for forming protruded particles on the minute unevenness surface. Exemplified as thixotropic agents are silica, mica and the like with 0.1 µm or less in particle size. In general, a content of an additive described above is preferably about from 1 to 15 parts by weight relative to 100 parts by weight of an ultraviolet curing resin.

As fine particles 3, material having transparency, such as various metal oxide, glass, and plastic, may be used especially without any limitation. For example, among these examples are, inorganic oxide fine particles, such as silica, alumina, titania, zirconium oxide, calcium oxide, tin oxide, indium oxide, cadmium oxide and antimony oxide that may have conductivity; cross-linked or linear organic fine particles comprising various polymers, such as polymethylmethacrylates, polystyrenes, polyurethanes, acryl-styrene copolymers, benzoguanamine, melamines, and polycarbonates; and silicone based fine particles, etc. Though these fine particles 3 may be used independently or, two or more kinds may be selected and used in combination, organic particles are preferable. An average particle diameter of the fine particles is 1 to 10 µm, and preferably 2 to 5 µm.

Formation method of the resin coating layer 2 comprising the fine particles 3 not especially limited, but proper methods may be adopted. For example, a resin (for example an ultraviolet curing resin: coating solution) comprising the fine particles 3 is coated on the above described transparent film 1, then curing processing being given after dried to form a resin coating layer 2 giving unevenness shape on the surface.

Coating of the above described resin is carried out by proper methods, such as fountain, die coater, casting, spin coat, fountain metalling, and photogravure etc.

In order to obtain an average height-depth spacing (Sm), a center-line average surface roughness (Ra) and a ten-point average surface roughness (Rz) on a surface of the formed light-diffusing layer 4, an average particle diameter of fine particles 3 contained in the coating liquid, a proportion of the fine particles 3 therein and a thickness of the resin coating layer 2 are properly adjusted.

Although the percentage of the fine particles 3 included in the above described coating solution is not especially limited, in order to suppress the glittering, it is preferably 6 to 20 parts by weight to a resin 100 parts by weight. Besides, although the thickness of the resin coating layer 2 is not especially limited, it is preferably approximately 3 to 6 µm, and more especially 4 to 5 µm.

A low refractive index layer having antireflection function may be provided on a surface with the minute unevenness of the resin coating layer 2. Materials of the low refractive index layer are not especially limited, as long as they have refractive indexes lower than that of the light-diffusing layer 4 which is the resin coating layer 2 if the resin coating layer 2 is prepared. Methods of forming the low refractive index layer are not especially limited; a wet coating method that is simpler as compared with a vacuum deposition method etc. is preferable.

Note that in formation of the low refractive index layer, hydrophilicization can be applied on a surface of the resin coating layer 2. As hydrophilicizing means, on which no specific limitation is placed, there can be preferably adopted any of surface treatment methods, for example corona discharge, a sputtering treatment, low pressure UV irradiation, a plasma treatment and the like. Furthermore, it is possible to apply a treatment improving adhesion, such as a thin film coating treatment with a cellulose-based material or a polyester-based material.

As materials for forming the low refractive index layer, for example, resin based materials such as ultraviolet curing type acrylate resins; hybrid type materials having inorganic fine particles, such as colloidal silica, dispersed in a resin; and sol-gel based materials using metal alkoxides, such as tetra-ethoxy silane and titanium tetra-ethoxide may be mentioned. In order to give soil-resistance to a surface, compounds including fluorine groups may be used as each material. There is a tendency for the low refractive index layer material having a large content of inorganic constituents to be excellent in view of mar resistance, and sol-gel based materials are especially preferable.

Perfluoro alkyl alkoxy silanes may be illustrated as sol-gel based materials including the fluorine groups. As perfluoro alkyl alkoxy silanes, for example, compounds expressed with a general formula (1): $CF_3(CF_2)_nCH_2CH_2Si(OR)_3$ (where R represents alkyl group of carbon numbers of 1 to 5, and n represents an integer of 0 to 12) may be mentioned. Specifically, for example, trifluoro propyl trimethoxy silane, trifluoro propyl triethoxy silane, trideca fluoro octyl trimethoxy silane, trideca fluoro octyl triethoxy silane, heptadeca fluoro decyl trimethoxy silane, and heptadeca fluoro decyl triethoxy silane may be mentioned. Among them compounds having the above-described n of 2 to 6 are preferable. In formation of the low refractive index layer, sols in which silica, alumina, titania, zirconium oxide, magnesium fluoride, cerium oxide etc. are dispersed in alcoholic solvents may be added. In addition, additives, such as metal salts and metallic compounds, may suitably be blended.

A thickness of the low refractive index layer is not especially limited, and is about 0.05 to 0.3 µm, and especially preferably 0.1 to 0.3 µm.

Moreover, optical elements may be adhered to the above described transparent film 1 of the light-diffusing sheet. As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, dyes is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent film in the above described illustration may be used. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned. As the above described transparent protective film, a transparent protective film whose both sides, surface side and backside, are formed from same polymer material may be used, and also a transparent protective film whose both sides are formed by different polymer materials etc. may be used. Materials excellent in transparency, mechanical strength, heat stability, water shielding property, isotropy, etc. are preferable. In many cases, it is preferable that the transparent protective film has small optical anisotropies, such as retardation. In providing the light-diffusing sheet on one side or both sides of a polarizer (a polarizing plate), a transparent film of the light-diffusing sheet can serve also as a transparent protective film of the polarizer. A thickness of the transparent protective film is not especially limited, and it is about 10 to 300 µm in general.

In lamination of the light-diffusing sheet to the polarizing plate, a transparent protective film, a polarizer, and a transparent protective film may sequentially be laminated onto the light-diffusing sheet, and a polarizer and a transparent protective film may be sequentially laminated onto the light-diffusing sheet.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

Moreover, for example, a hard coat layer, a primer layer, an adhesive layer, a pressure sensitive adhesive layer, an antistatic layer, an electrically conductive layer, a gas barrier layer, a steam barrier layer, a moisture barrier layer, etc. may be inserted in between layers of polarizing plates, or these may be laminated on a surface of the polarizing plate. Besides, in a stage for forming each layer of the polarizing plate, for example, if required, various characteristics may be improved by adding or mixing conductive particles, antistatic agents, various particles, plasticizers, etc. into forming materials of each layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate. In an elliptically polarizing plate, a polarizing plate with an optical compensation and the like, a light-diffusing sheet is disposed on a side of the polarizing plate.

Furthermore, if necessary, treatments for giving various kinds of characteristics, functions, such as mar resistance, durability, weather resistance, wet heat resistance, heat resistance, moisture resistance, moisture permeability, antistatic property, electric conductivity, improvement in adhesive properties between layers, mechanical strength improvement etc. may also be performed, or insertion, lamination, etc. of functional layers may also be performed.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal biaxial stretching and a biaxially stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid-crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a trans-flective type polarizing plate is combined with above described retardation plate respectively.

Although a laminating of the above described light-diffusing sheet to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the light-diffusing sheet, while a layer not prepared the light-diffusing sheet an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows light diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the light-diffusing sheet of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, light diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent film in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent film and is transmitted through a transparent electrode and an organic luminescence layer and then is reflected by a metal electrode, appears in front surface side of the transparent film again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent film, the transparent electrode and the organic thin film, and is reflected by the metal electrode, and then is transmitted through the organic thin film, the transparent electrode and the transparent film again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

While description will be given of the present invention using examples below, it should be understood that the present invention is not limited at all by the examples.

Preparation Example 1

Dissolved into methylene chloride were 75 parts by weight of an alternating copolymer composed of isobutene and N-methyl maleimide (a content of N-methyl maleimide of 50 mol %), 25 parts by weight of an acrylonitrile-styrene copolymer containing 28 wt % of acrylonitrile to obtain a solution with a solid matter concentration of 15 wt %. The solution is caused to flow and spread on a polyethylene terephthalate film laid on a glass plate, and the solution film was left on the polyethylene terephthalate film at room temperature for 60 min and thereafter, was peeled off therefrom. The film prepared from the solution was dried at 100° C. for 10 min, thereafter at 140° C. for 10 min and further at 160° C. for 30 min to obtain a transparent film with a thickness of 50 μm. An in-plane retardation Re of the transparent film was 4 nm, and a thickness direction retardation Rth thereof was 4 nm.

Note that, an in-plane retardation Re, a thickness direction retardation Rth were calculated from refractive indexes nx, ny and nz measured with an automatic birefringence measuring instrument (made by Ohji Keisoku Kiki K.K. with a trade name of an automatic birefringence meter KOBRA21ADH).

Preparation Example 2

Used were 65 parts by weight of a glutarimido copolymer composed of N-methyl glutarimide and methyl methacrylate (a content of N-methyl glutarimide of 75 wt %, an acid content of 0.01 or less milliequivalent/g and a glass transition temperature of 147° C.), and 35 parts by weight of an acrylonitrile-styrene copolymer containing 28 wt % of acrylonitrile and 72 wt % of styrene, the mixture was melt kneaded to obtain a resin composition and the resin composition was supplied to a T-die melt extruder to obtain a film with a thickness of 135 μm. The obtained film was stretched in the MD direction at 160° C. with a stretch magnification of 1.7 times and thereafter stretched in the TD direction at 160° C. with a stretch magnification of 1.8 times. A thickness of the obtained biaxially stretched transparent film was 55 μm, an in-plane retardation Re was 1 nm and a thickness direction retardation Rth was 3 nm.

Example 1

Mixed into a solution were 12 parts by weight of polystyrene beads with an average particle size 3.5 μm, 100 parts by weight of an ultraviolet curing resin (polyurethane acrylate-based monomer), 5 parts by weight of a benzophenon-based photopolymerization initiator and a solvent (toluene) in amount at which a solid matter concentration of the solution was 40 wt %, the solution was coated on a transparent film obtained in Preparation Example 1, the wet coat was dried at 120° C. for 5 min and thereafter the dried film was subjected to a curing treatment of irradiation with ultraviolet to prepare a light-diffusing sheet having a resin coating layer, of about 4 μm in thickness, and with the minute unevenness surface.

Example 2

A transparent film of 100 μm in thickness was prepared in a similar way to that in Preparation Example 1. The transparent film is stretched 1.5-fold at 160° C. in the MD direction and thereafter, stretched 1.5-fold at 160° C. in the TD direction to thereby obtain a biaxially stretched transparent film of 45 μm in thickness. An in-plane retardation Re of the biaxially stretched transparent film was 4 nm and a thickness direction retardation Rth thereof was 12 nm. A light-diffusing sheet was prepared in a similar way to that in Example 1 with the exception that the biaxially stretched transparent film was used as the transparent film in Example 1.

Example 3

A light-diffusing sheet was prepared in a similar way to that in Example 1 with the exception that in Example 1, the use amount of polystyrene beads was changed to 14 parts by weight.

Example 4

A light-diffusing sheet was prepared in a similar way to that in Example 1 with the exception that in Example 1, the thickness of the resin coating layer was changed to 3 μm.

Example 5

A light-diffusing sheet was prepared in a similar way to that in Example 2 with the exception that in Example 2, a low refractive index layer of 0.1 μm in thickness (made of a fluorine modified polysiloxane with a refractive index 1.39) lower in refractive index than the resin coating layer (with a refractive index of 1.51) was provided on the unevenness surface of the resin coating layer.

Example 6

A light-diffusing sheet was prepared in a similar way to that in Example 1 with the exception that in Example 1, as the transparent film, the biaxially stretched transparent film obtained in Preparation Example 2 was used.

Comparative Example 1

A light-diffusing sheet was prepared in a similar way to that in Example 1 with the exception that in Example 1, as the transparent film, a triacetyl cellulose film of 80 μm in thickness (with an in-plane retardation of Re of 2 nm and a thickness direction retardation Rth of 40 nm) was used.

Comparative Example 2

A light-diffusing sheet was prepared in a similar way to that in Example 1 with the exception that in Example 1, as the transparent film, a norbornene-based film of 40 μm in thickness (with an in-plane retardation of Re of 4 nm and a thickness direction retardation Rth of 20 nm) was used.

Comparative Example 3

A light-diffusing sheet was prepared in a similar way to that in Example 1 with the exception that in Example 1, as the transparent film, a biaxially stretched polycarbonate film of 50 μm in thickness (with an in-plane retardation of Re of 10 nm and a thickness direction retardation Rth of 120 nm) was used.

Comparative Example 4

A light-diffusing sheet was prepared in a similar way to that in Example 1 with the exception that in Example 1, 12 parts by weight of polystyrene beads of 3.5 μm in average particle diameter was replaced with 12 parts by weight of silica beads of 2 to 3 μm in average particle diameter.

Comparative Example 5

A light-diffusing sheet was prepared in a similar way to that in Example 1 with the exception that in Example 1, the use amount of polystyrene beads is changed to 10 parts by weight and the thickness of the resin coating layer was changed to 2.5 μm.

The surface unevenness shape of the light-diffusing sheets obtained in the examples and comparative examples were measured with a stylus-type surface roughness measuring instrument manufactured by TOKYO SEIMITSU Co. Ltd. with a trade name of Surfcom 470A according to JIS B0601. The measurement was conducted in a way such that an evenness surface was scanned in contact over a length thereof of 3 mm in a direction using a stylus with a conical tip having a vertex angle of 55 degrees and made of diamond to measure and record motion of the stylus tip in a direction normal to the nominal profile and to calculate an average height-depth spacing (Sm), a center-line average surface roughness (Ra) and a ten-point average surface roughness (Rz) from the recorded surface roughness curve. A 60° glossiness was measured with a digital variable angle gloss-meter UGV-5DP manufactured by Suga Testing Machine Co. according to JIS K7105-1981. Results of the measurement are shown in Table 1.

TABLE 1

| | Sm (μm) | Rz (μm) | Ra (μm) | Rz/Ra | 60° glossiness (%) |
|---|---|---|---|---|---|
| Example 1 | 60.2 | 1.29 | 0.15 | 8.60 | 60.3 |
| Example 2 | 60.1 | 1.29 | 0.15 | 8.60 | 60.2 |
| Example 3 | 49.0 | 0.87 | 0.12 | 7.25 | 58.7 |
| Example 4 | 34.9 | 1.53 | 0.23 | 6.65 | 29.8 |
| Example 5 | 51.5 | 1.54 | 0.22 | 7.00 | 35.8 |
| Example 6 | 60.5 | 1.30 | 0.15 | 8.67 | 60.5 |
| Comparative Example. 1 | 60.0 | 1.28 | 0.15 | 8.53 | 60.0 |
| Comparative Example. 2 | 60.1 | 1.28 | 0.15 | 8.53 | 60.1 |
| Comparative Example. 3 | 60.0 | 1.28 | 0.15 | 8.53 | 60.0 |
| Comparative Example. 4 | 47.6 | 26.1 | 0.34 | 7.68 | 51.7 |
| Comparative Example. 5 | 54.0 | 1.49 | 0.16 | 9.31 | 42.1 |

In Table 2, there are shown results obtained by application of the following evaluations to light-diffusing sheets obtained in the examples and comparative examples.

(Glittering)

A composite obtained by adhering a polarizing plate (185 μm) to a light-diffusing sheet was further adhered to a glass substrate to visually evaluate a glittering level on a mask pattern (with an aperture area percent of 25%) fixed on a light table with the following ratings. Note that antiglareness under a fluorescent lamp was good in any of the samples. The ratings are given with symbols as follows:

○○: absolutely no glittering is observed
○: almost no glittering is observed
Δ: low glittering is observed with no practical problem
X: glittering is observed (Adhesion)

A light-diffusing sheet was adhered to a glass plate with a pressure-sensitive adhesive agent to evaluate adhesion at an initial stage of a light-diffusing layer (resin coating layer) to a transparent film with the following ratings according to JIS K5400 using a checkerboard tape peeling test.

○○: absolutely no peeling is observed
Δ: a peeled area is less than 65% of the total square area, with exclusion of a case where absolutely no peeling occurs
X: a peeled area is 65% or more of the total square area (Durability)

A light-diffusing sheet was adhered to a glass plate with a pressure-sensitive adhesive agent and put into a thermo-hygrostat at 80° C. and 90% R.H. When 570 hr and 1000 hr elapsed thereafter, outer appearance and adhesion were evaluated with the following ratings.

○○: neither cracking nor peeling was observed 570 hr and 1000 hr elapsed thereafter all over the surface
X: cracking and peeling were observed 570 hr elapsed thereafter

TABLE 2

| | glittering | adhesion | durability |
|---|---|---|---|
| Example 1 | ○○ | ○○ | ○○ |
| Example 2 | ○○ | ○○ | ○○ |
| Example 3 | ○○ | ○○ | ○○ |
| Example 4 | ○ | ○○ | ○○ |
| Example 5 | ○ | ○○ | ○○ |
| Example 6 | ○○ | ○○ | ○○ |
| Comparative Example. 1 | ○○ | ○○ | X |
| Comparative Example. 2 | ○○ | X | — |
| Comparative Example. 3 | ○○ | ○○ | ○○ |
| Comparative Example. 4 | X | ○○ | ○○ |
| Comparative Example. 5 | X | ○○ | ○○ |

As shown in Table 2, it is recognized that a light-diffusing sheet of the present invention is excellent in prevention of glittering, adhesion and durability.

Example 7

A polarizing plate with a light-diffusing function was obtained by not only adhering the light-diffusing sheet prepared in Example 1 to one surface of a polyvinyl alcohol-based polarizer using a polyurethane-based adhesive agent, but also stacking the transparent film prepared in Example 1 on the other surface thereof in a similar way.

Example 8

A polarizing plate with a light-diffusing function was obtained by not only adhering the light-diffusing sheet prepared in Example 2 to one surface of a polyvinyl alcohol-based polarizer using a polyurethane-based adhesive agent, but also stacking the biaxially stretched transparent film prepared in Example 2 on the other surface thereof in a similar way.

Example 9

A polarizing plate with a light-diffusing function was obtained by not only adhering the light-diffusing sheet prepared in Example 6 to one surface of a polyvinyl alcohol-based polarizer using a polyurethane-based adhesive agent, but also stacking the biaxially stretched transparent film prepared in Example 2 on the other surface thereof in a similar way.

Comparative Example 6

A polarizing plate with a light-diffusing function was obtained by not only adhering the light-diffusing sheet prepared in Comparative Example 1 to one surface of a polyvinyl alcohol-based polarizer using a polyurethane-based adhesive agent, but also stacking a triacetyl cellulose film on the other surface thereof in a similar way.

Comparative Example 7

A polarizing plate with a light-diffusing function was obtained by not only adhering the light-diffusing sheet prepared in Comparative Example 3 to one surface of a polyvinyl alcohol-based polarizer using a polyurethane-based adhesive agent, but also stacking a polycarbonate film on the other surface thereof in a similar way.

The polarizing plates with a light-diffusing function prepared in Examples 7 to 9 and Comparative examples 6 and 7 were adhered in a way such that two pieces of each polarizing plates were adhered with the polarization axes perpendicular to each other to measure a transmittance (%) at an azimuth angle of 45° from the polarization axis direction and a polar angle of 70°. A transmittance was measured with a spectrophotometer U-4100 manufactured by Hitachi Ltd. at a wavelength of 550 nm. Results are shown in Table 3.

TABLE 3

|  | transmittance (%) |
| --- | --- |
| Example 7 | 1.7 |
| Example 8 | 2.0 |
| Example 9 | 1.7 |
| Comparative Example 6 | 3.8 |
| Comparative Example 7 | 16.0 |

As shown in Table 3, it is recognized that a polarizing plate with a light-diffusing function excellent in polarization characteristic is obtained using a light-diffusing sheet of the present invention.

Industrial Applicability

A light-diffusing sheet of the present invention and an optical element provided with the light-diffusing sheet can suppress reduction in visual recognizability of screen, thereby enabling the light-diffusing sheet to be suitably applied in image viewing displays such as a liquid crystal display (LCD), a flat panel display (FPD), an organic EL, PDP and others.

What is claimed is:

1. A light-diffusing sheet comprising a transparent film and a light-diffusing layer, which is made of a resin coating layer having a minute unevenness formed on a surface thereof, is formed on at least one side of the transparent film,
    wherein the transparent film includes a thermoplastic resin (A) having a substituted and/or non-substituted imido group in a side chain, and a thermoplastic resin (B) having a substituted and/or non-substituted phenyl group and nitrile group in a side chain, and
    an average height-depth spacing (Sm), a center-line average surface roughness (Ra) and a ten-point average surface roughness (Rz) on the surface with the minute unevenness satisfies the respective following relations:

$Sm \leq 80$ μm, $Ra \leq 0.25$ μm and $Rz \leq 9Ra$, wherein a 60° glossiness on the surface with the minute unevenness is 70% or less.
2. The light-diffusing sheet according to claim 1, wherein the transparent film is a biaxially stretched film.
3. The light-diffusing sheet according to claim 1, wherein the resin coating layer comprises fine particles and the surface unevenness shape of the resin coating layer is formed with the fine particles.
4. The light-diffusing sheet according to claim 3, wherein the fine particles are organic fine particles.
5. The light-diffusing sheet according to claim 1, wherein the resin coating layer is formed with an ultraviolet curing resin.
6. A light-diffusing sheet, a low refractive index layer lower in refractive index than the resin coating layer is provided on the unevenness surface of the resin coating layer of the light-diffusing sheet according to claim 1.
7. An optical element comprising the light-diffusing sheet according to claim 6 provided on one side or both sides of an optical element.
8. An image viewing display comprising the optical element according to claim 7.
9. An optical element comprising the light-diffusing sheet according to claim 1 provided on one side or both sides of an optical element.
10. An image viewing display comprising the optical element according to claim 9.
11. The light-diffusing sheet according to claim 1, wherein if in the transparent film, a direction along which an in-plane refractive index is maximized is X axis, a direction perpendicular to X axis is Y axis, a thickness direction of the film is Z axis; refractive indexes in the respective axis directions are nx, ny and nz; and a thickness of the transparent film is d (nm) by definition, the transparent film satisfies the following relations:
    in-plane retardation $Re=(nx-ny) \times d\ 20$ nm and
    thickness direction retardation $Rth=\{(nx+ny)/2-nz\} \times d \geq 30$ nm.

* * * * *

UNITED STATES PATENT AND TRADEMARK OFFICE
CERTIFICATE OF CORRECTION

| | | |
|---|---|---|
| PATENT NO. | : 7,245,434 B2 | Page 1 of 1 |
| APPLICATION NO. | : 10/511397 | |
| DATED | : July 17, 2007 | |
| INVENTOR(S) | : Akihiro Nishida et al. | |

It is certified that error appears in the above-identified patent and that said Letters Patent is hereby corrected as shown below:

At Column 1, Line 5, please delete "PCTIJP03/05078" and insert -- PCT/JP03/05078 --, therefor.

At Column 1, Line 20 (approximately), please delete "BACKGROUNG" and insert -- BACKGROUND --, therefor.

At Column 6, Line 55, please delete "nitrites" and insert -- nitriles --, therefor.

At Column 7, Line 10, please delete "nitrites" and insert -- nitriles --, therefor.

At Column 7, Line 26, after "required" please delete "-".

At Column 7, Line 53, after "minute" please delete "-".

At Column 24, Line 59, in Claim 11, please delete "d 20" and insert -- $d \leq 20$ --, therefor.

At Column 24, Line 61, in Claim 11, please delete "$d \geq 30$" and insert -- $d \leq 30$ --, therefor.

Signed and Sealed this

Twenty-seventh Day of May, 2008

JON W. DUDAS
*Director of the United States Patent and Trademark Office*